United States Patent Office 2,992,263
Patented July 11, 1961

---

2,992,263
DICYCLOHEXYLTETRAHYDROXYDISILOXANE
John F. Brown, Jr., Schenectady, N.Y., assignor to General Electric Company, a corporation of New York
No Drawing. Filed Oct. 23, 1959, Ser. No. 848,222
1 Claim. (Cl. 260—448.2)

This invention is concerned with a novel polysiloxane. More particularly, the invention relates to the chemical composition having the formula

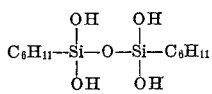

The above dicyclohexyltetrahydroxydisiloxane can be prepared in various ways. One method comprises dissolving cyclohexyltrichlorosilane in a polar solvent, for example, acetone, and thereafter effecting hydrolysis of the solution of the cyclohexyltrichlorosilane in water. After allowing the hydrolysis product to stand, the solid crystalline material which deposits is removed and is then recrystallized by dissolving it first in hot ethanol and thereafter adding a non-polar solvent, such as benzene, to effect deposition of the purified crystallized dicyclohexyltetrahydroxydisiloxane.

In order that those skilled in the art may better understand how the above compound may be prepared, the following example is given by way of illustration. All parts are by weight.

Example 1

Twenty-six parts of cyclohexyltrichlorosilane was dissolved in 79.2 parts acetone and this solution was then poured into 1200 parts cold water at a temperature of about 20° C. The hydrolysis mixture was allowed to remain at around room temperature (about 27° C.) for about 96 hours. The solid material which had deposited at the end of this time was then filtered and dried. The dried product was dissolved in about 78.9 parts hot ethanol and to the hot solution thereof was added 175.8 parts benzene. On cooling to room temperature, about 9.6 parts of dicyclohexyltetrahydroxydisiloxane was obtained having a melting point of between 205–215° C. Analysis of this compound showed that it contained 47.1 percent carbon and 8.7 percent hydrogen as contrasted to the theoretical values for dicyclohexyltetrahydroxydisiloxane of 47.0 percent carbon and 8.5 percent hydrogen.

The above disiloxane has many uses. Because of the high functionality due to the presence of the four silicon-bonded hydroxyl groups, this compound can be mixed with a dehydrating agent, for example, ethyl borate, or with a drier such as the metallic salts of organic carboxylic acids, for instance, iron octoate (examples of such driers for curing silicone resins are more particularly disclosed in Welsh Patent 2,449,572, issued September 21, 1948, and assigned to the same assignee as the present invention), and the mixture of ingredients heated at elevated temperatures of about 125–200° C. to effect conversion to the thermoset state. Such resins prior to conversion of the thermoset state can be used in solution form to coat conductors and the coated conductor thereafter passed through a heated zone to effect curing to give an insulation on the conductor which is heat resistant and is also capable of being resistant to extremes in moisture.

A particularly good use for the above disiloxane is as an additive in silicone rubber to prevent formation of "structure" or nerve in the rubber as a result of there being combined with the rubber a reinforcing filler such as fume silica, precipitated silica, silica aerogel, etc. The use of hydroxysilanes and hydroxy polysiloxanes for the purpose of reducing structure in silicone rubber when there is present a reinforcing filler is disclosed in U.S. Patent 2,890,188, Konkle et al., assigned to Dow Corning Corporation. Thus, from 0.1 to 5 percent, by weight, of the disiloxane based on the weight of the silicone gum, can be incorporated in a polydimethylsiloxane gum containing about 0.1 mole percent silicon-bonded vinyl groups and the gum mixed with a reinforcing filler of the class mentioned above. Such mixtures of ingredients show a minimum of structure even after standing for long periods of time.

What I claim as new and desire to secure by Letters Patent of the United States is:

The chemical compound dicyclohexyltetrahydroxydisiloxane having the formula

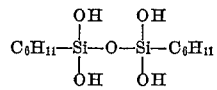

References Cited in the file of this patent

Palmer et al.: "Jour. Chem. Soc." (London), vol. 133 (1930), pp. 1020–28.